(12) United States Patent
Nukushina

(10) Patent No.: US 8,631,847 B2
(45) Date of Patent: Jan. 21, 2014

(54) PNEUMATIC TIRE

(75) Inventor: Ryousuke Nukushina, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 401 days.

(21) Appl. No.: 12/958,266

(22) Filed: Dec. 1, 2010

(65) Prior Publication Data

US 2011/0139326 A1     Jun. 16, 2011

(30) Foreign Application Priority Data

Dec. 11, 2009 (JP) .................. 2009-282045

(51) Int. Cl.
*B60C 13/00* (2006.01)
*B60C 13/02* (2006.01)

(52) U.S. Cl.
USPC .......................................... 152/523

(58) Field of Classification Search
CPC .............................. B60C 13/02; B60C 13/001
USPC .......................................... 152/209.16, 523
See application file for complete search history.

(56) References Cited

U.S. PATENT DOCUMENTS

| 4,152,186 | A | * | 5/1979 | Shibata | 156/123 |
| 6,053,228 | A | * | 4/2000 | Baker | 152/523 |
| 2010/0000648 | A1 | * | 1/2010 | Nakano | 152/523 |

FOREIGN PATENT DOCUMENTS

| JP | 09-226328 | * | 9/1997 |
| JP | 11198614 | | 7/1999 |
| JP | H11-291722 | | 10/1999 |
| JP | 2004-224342 | * | 8/2004 |
| JP | 2004338655 | | 12/2004 |
| JP | 3733054 | | 10/2005 |
| JP | 2008-001353 | | 1/2008 |
| JP | 2008137541 | | 6/2008 |
| JP | 2009-160991 | | 7/2009 |
| WO | WO2007/136091 | * | 11/2007 |

OTHER PUBLICATIONS

English machine translation of JP09-226328, dated Sep. 1997.*
Related German Application DE 10 2010 061 740.7, The Yokohama Rubber Co., Ltd., Office Action Issued Nov. 22, 2010.
Japanese Office Action dated Sep. 18, 2013, 4 pages, Japan.

* cited by examiner

*Primary Examiner* — Justin Fischer
*Assistant Examiner* — Robert Dye
(74) *Attorney, Agent, or Firm* — Thorpe North & Western LLP

(57) ABSTRACT

Protruding ridges on a surface of a side wall portion extending in a tire radial direction for a predetermined range in the tire radial direction and being provided in a plurality in a row arrangement in a tire circumferential direction, wherein the ridges are formed continuously in the predetermined range from a first edge in the tire radial direction to a second edge; and characters are formed by the ridges including reference parts provided on a reference line that connects the first edge in the tire radial direction to the second edge, and curved parts that depart from and return to the reference line by bending or curving.

20 Claims, 11 Drawing Sheets

| | C.E. | W.E. 1 | W.E. 2 | W.E. 3 | W.E. 4 | W.E. 5 | W.E. 6 | W.E. 7 | W.E. 8 | W.E. 9 | W.E. 10 |
|---|---|---|---|---|---|---|---|---|---|---|---|
| Design form: Protrusion (no ridge portion) | ○ | × | × | × | × | × | × | × | × | × | × |
| Design form: Ridge variation | × | ○ | ○ | ○ | ○ | ○ | ○ | ○ | ○ | ○ | ○ |
| Variation (mm) | — | 0.2 | 6.0 | 0.3 | 5.0 | 3.0 | 3.0 | 3.0 | 3.0 | 3.0 | 3.0 |
| Angle of Reference Line (°) | — | 0 | 0 | 0 | 0 | 70 | 30 | 30 | 30 | 30 | 30 |
| (Height of reference parts) − (Height of curved parts) | — | 0 | 0 | 0 | 0 | 0 | 0 | −0.5 | 0.7 | 0.2 | 0.6 |
| Number of curved parts | — | 4 | 4 | 4 | 4 | 4 | 4 | 4 | 4 | 4 | 6 |
| Visibility | 3 | 4 | 5 | 5 | 5 | 5 | 5 | 4 | 5 | 4 | 5 |
| Cracking resistance | 100 | 115 | 110 | 115 | 115 | 110 | 115 | 115 | 115 | 115 | 115 |

Notes: As used in FIG. 15, "C.E." refers to "Conventional Example", and "W.E." refers to "Working Example".

FIG. 15

PNEUMATIC TIRE

PRIORITY CLAIM

This application is based upon and claims the benefit of priority from Japanese Patent Application No. 2009-282045, filed Dec. 11, 2009, the entire contents of which is incorporated herein by reference.

BACKGROUND

1. Technical Field

The present invention relates to a pneumatic tire having characters on a surface of a side wall portion.

2. Related Art

In a pneumatic tire (tire) described in Japanese Patent No. 3733054, a surface of a side wall portion is provided with a decorative portion formed from a serration provided with ridges in a row arrangement having small widths and protruding from the surface. The ridges are provided with intermittent sections and characters (marks) are displayed as block characters via the intermittent sections.

However, there can be a tendency for cracking to occur easily based on steps formed by the intermittent sections because the ridges are provided with the intermittent sections.

In light of the foregoing, an object of the present invention is to provide a pneumatic tire in which characters can be formed using ridges and, at the same time, which can suppress cracking in portions where the ridges are provided.

SUMMARY

In order to solve the problems described above and achieve the object, the pneumatic tire of the present invention includes protruding ridges on a surface of a side wall portion extending in a tire radial direction for a predetermined range in the tire radial direction and being provided in a plurality in a row arrangement in a tire circumferential direction, wherein the ridges are formed continuously in the predetermined range from a first edge in the tire radial direction to a second edge. Characters can be formed by reference parts provided on a reference line, that connects the first edge in the tire radial direction to the second edge, and curved parts that depart from and return to the reference line by bending or curving.

According to this pneumatic tire, characters are formed using the ridges through the reference parts and the curved parts. Moreover, cracking in portions where the ridges are provided can be suppressed because the ridges are formed continuously in the predetermined range from the first edge in the tire radial direction to the second edge.

Additionally, the characters are formed in the tire circumferential direction by the reference parts and the curved parts of the ridges.

According to this pneumatic tire, characters having good visibility can be displayed in the tire circumferential direction and visibility of the pneumatic tire itself can be enhanced due to the reference parts and the curved parts of the ridges.

Additionally, a variation V of the curved parts that depart from and return to the reference line is set in a range of 0.3 mm≤V≤5.0 mm.

If the variation V of the curved parts is less than 0.3 mm, a run-out width of the variation V will be insufficient, and it will be difficult to obtain the visibility effect of the characters via the reference parts and the curved parts. On the other hand, if the variation V of the curved parts exceeds 5.0 mm, stiffness of the ridges will decrease, and it will be difficult to suppress cracking. It follows that the visibility effect of the characters can be obtained and the suppression of cracking effect can be obtained by setting the variation V to a range of 0.3 mm≤V≤5.0 mm.

Additionally, an angle of the reference line with respect to the tire radial direction is set to a range of ±45°. If the angle of the reference line with respect to the tire radial direction deviates from the range of ±45°, deformations will occur in the ridges during travelling, leading to a tendency for cracks in the tire circumferential direction to occur easily. It follows that the suppression of cracking effect can be obtained by setting the angle of the reference line with respect to the tire radial direction in the range of ±45°.

Additionally, the curved parts have a different height from the surface of the side wall portion than the reference parts.

According to this pneumatic tire, the visibility effect of the characters via the reference parts and the curved parts can be obtained and the characters can be made prominently visible due to the difference between the height of the reference parts and the height of the curved parts.

Additionally, a height H1 of the reference parts from the surface of the side wall portion is set in a range of 0.6 mm<H1≤2.0 mm, and a height H2 of the curved parts from the surface of the side wall portion is formed lower, with respect to the height H1 of the reference parts, in a range of 0.2 mm≤(H1−H2)≤0.6 mm.

If the height H1 of the reference parts is not greater than 0.6 mm, a distance from a peak of the reference parts to the surface of the side wall portion will be too short, and it will be difficult to obtain the visibility effect of the characters via the reference parts and the curved parts. On the other hand, if the height H1 of the reference part exceeds 2.0 mm, during molding, a flow of vulcanized rubber into a mold for forming the ridges will be unfavorable, leading to a tendency for air pockets to form easily. Moreover, if the height H2 of the curved parts is less than 0.2 mm lower with respect to the height H1 of the reference parts, a difference between the heights of the reference parts and the curved parts will be small, and it will be difficult to obtain the visibility effect of the characters via the reference parts and the curved parts. On the other hand, if the height H2 of the curved parts is more than 0.6 mm lower with respect to the height H1 of the reference parts, the difference between the heights of the reference parts and the curved parts will be great and differences in stiffness will occur, leading to a tendency for cracking to occur easily in step portions. It follows that, according to this pneumatic tire, the visibility effect of the characters can be obtained and the suppression of cracking effect can be obtained.

Additionally, a number of the curved parts formed that depart from and return to the reference line is at least five. If there are fewer than five curved parts, contrast with the reference parts will not be clear, and it will be difficult to obtain the visibility effect of the characters via the reference parts and the curved parts. It follows that, according to this pneumatic tire, the visibility effect of the characters can be obtained.

With the pneumatic tire of the present invention, ridges can be used to form characters and, at the same time, cracking in a portion where the ridges are provided can be suppressed.

BRIEF DESCRIPTION OF THE DRAWINGS

FIG. 15 is a table showing results of performance tests of pneumatic tires of examples of the present invention.

DETAILED DESCRIPTION

Embodiments of the present technology are described below in detail based on the drawings. However, the present technology is not limited to these embodiments. Additionally, constituents of these embodiments include elements that are essentially identical or that could be easily substituted by a person skilled in the art. Furthermore, multiple modified examples described in the embodiments can be combined as desired within the scope apparent to a person skilled in the art.

In the following descriptions, additionally, "tire width direction" refers to a direction parallel to a rotational axis (not shown) of a pneumatic tire 1, and "outer side in tire width direction" refers to a side distanced from a tire equator surface (tire equator) in the tire width direction. "Tire circumferential direction" refers to a circumferential direction with the rotational axis as the center axis. Furthermore, "tire radial direction" refers to a direction orthogonal to the rotational axis; "inner side in the tire radial direction" refers to a side facing the rotational axis in the tire radial direction; and "outer side in the tire radial direction" refers to a side distanced from the rotational axis in the tire radial direction. Additionally, "tire equator surface" refers to a planar surface orthogonal to the rotational axis and that passes through a center of a tire width of the pneumatic tire 1. The tire width is the width in the tire width direction between constituents located to the outside in the tire width direction, or in other words, the distance between the most distant components from the tire equator surface in the tire width direction. Furthermore, "tire equator" refers to a line in the circumferential direction of the pneumatic tire 1 that lies on the tire equator surface.

Figure 1:
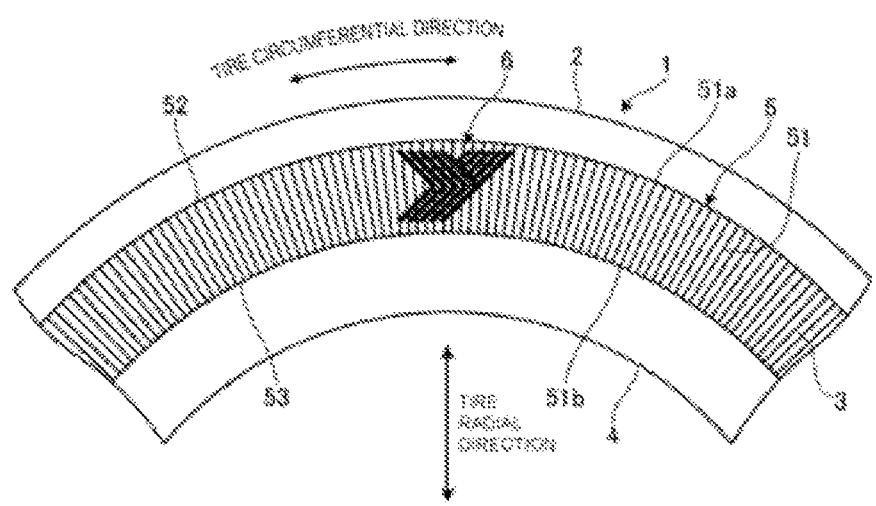
FIG. 1 is a side view of a pneumatic tire according to an embodiment.

In FIG. 1, which is a side view illustrating a pneumatic tire, the pneumatic tire 1 includes a tread portion 2 that is in contact with a road surface. A side wall portion 3 that is rim assembled on a rim (not illustrated in this pneumatic tire 1) is visible on the outermost side in the tire width direction when mounted on a vehicle. A bead portion 4 interlocks with this rim when rim assembled on the rim (not illustrated).

The side wall portion 3 has a ridge portion 5 on a surface thereof. The ridge portion 5 is formed in a circular shape in the tire circumferential direction. This ridge portion 5 has a plurality of protruding ridges 51 in a row arrangement in a tire circumferential direction that extend in a tire radial direction for a predetermined range in the tire radial direction. Additionally, with regards to the ridges 51, protrusions are formed continuously in the predetermined range in the tire radial direction from a first edge 51a in the tire radial direction to a second edge 51b. Regarding the plurality of ridges 51, the first edge 51a is disposed along an outer ring 52 of the ridge portion 5, and the second edge 51b is disposed along an inner ring 53 of the ridge portion 5. The outer ring 52 is formed in a circular shape in the tire circumferential direction and constitutes a border of the outer side in the tire radial direction, which is the predetermined range in the tire radial direction of the ridge portion 5, and is formed by protrusions. The inner ring 53 is formed in a circular shape in the tire circumferential direction and constitutes a border of the inner side in the tire radial direction, which is the predetermined range in the tire radial direction of the ridge portion 5, and is formed by protrusions.

Such a ridge portion 5 is provided on an outermost side in the tire width direction, and is also provided at an end where a carcass (not illustrated), which constitutes a skeleton of the pneumatic tire 1, is folded over the bead portion 4. Therefore, due to the contrast of the ridges 51, the ridge portion 5 can make protrusions on the surface of the side wall portion 3 caused by the folded over end of the carcass unnoticeable while improving the appearance of the outermost side in the tire width direction (the side wall portion 3).

Figure 2:
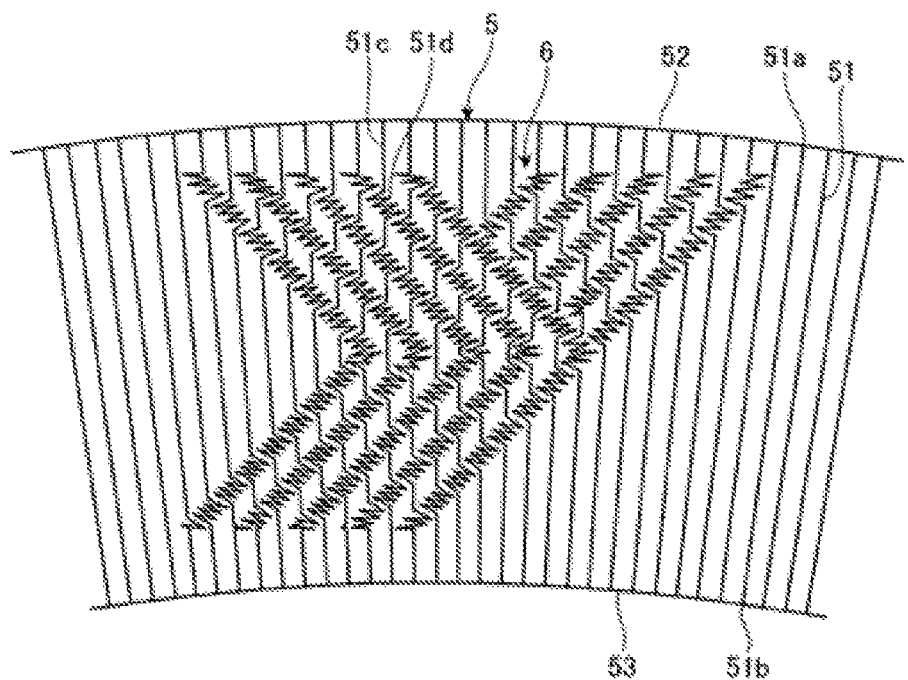
FIG. 2 is a partially enlarged view of the pneumatic tire illustrated in FIG. 1.

With the present embodiment, as illustrated in FIG. 2, in the ridge portion 5 described above, the ridges 51 have reference parts 51c provided on a reference line 50 (see FIGS. 3 to 7) that connect the first edge 51a in the tire radial direction to the second edge 51b and curved parts 51d that depart from and return to the reference line 50 by bending or curving. Characters 6 are formed by these reference parts 51c and curved parts 51d. "Characters 6" generally refers to letters/numbers, symbols, marks, and the like for use in expressing certain content, and also refers to objects including designs such as pictures and emblems.

Figure 5:
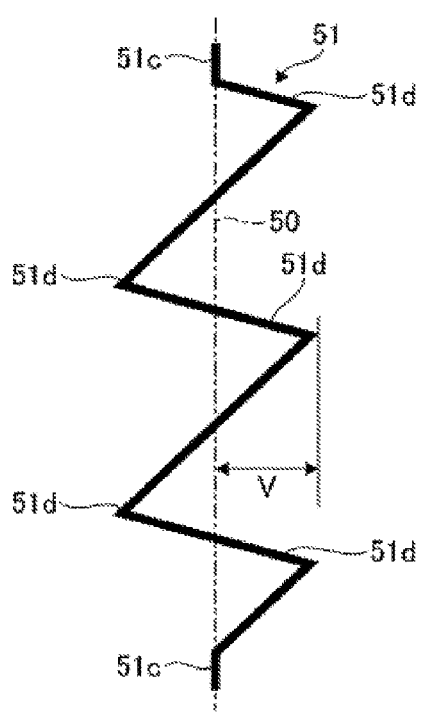
FIG. 5 is a schematic view illustrating a shape of a ridge.
Figure 6:
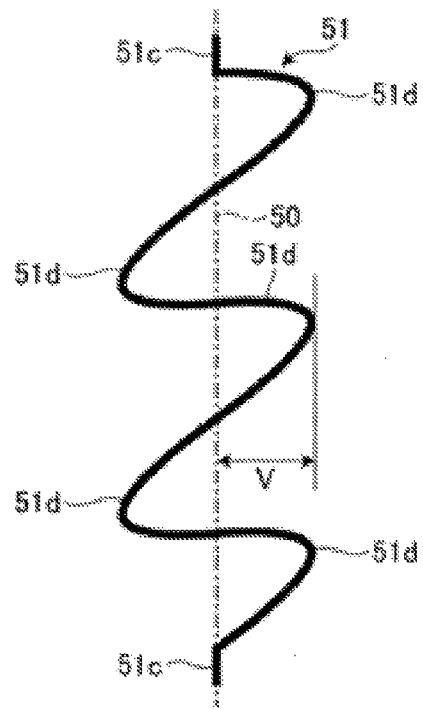
FIG. 6 is a schematic view illustrating a shape of a ridge.
Figure 7:
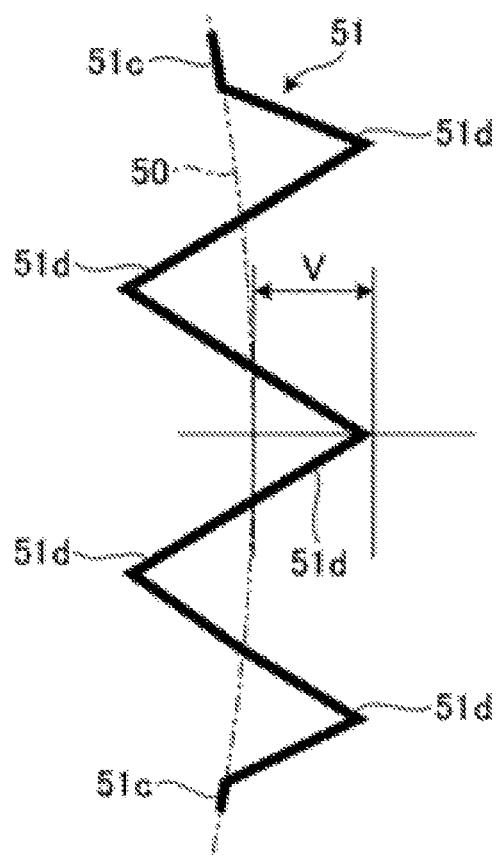
FIG. 7 is a schematic view illustrating a shape of a ridge.

The reference line 50 on which the reference parts 51c are provided may be a straight line as illustrated in FIGS. 3 to 6 or a curved line as illustrated in FIG. 7. When the reference line 50 is a straight line, the straight line is formed from the first edge 51a of the ridges 51 to the second edge 51b. Additionally, when the reference line 50 is a curved line, the curved line is formed having a prescribed curvature from the first edge 51a of the ridges 51 to the second edge 51b.

Figure 3:
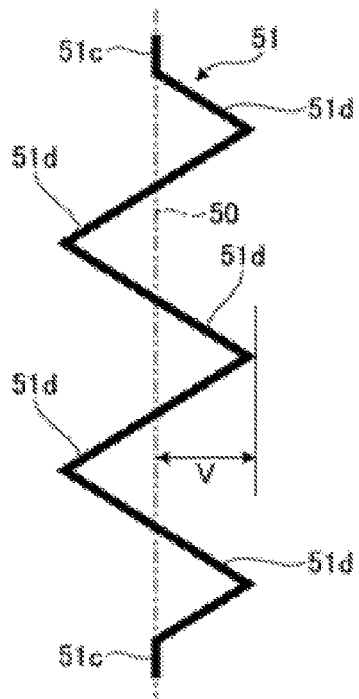
FIG. 3 is a schematic view illustrating a shape of a ridge.
Figure 4:
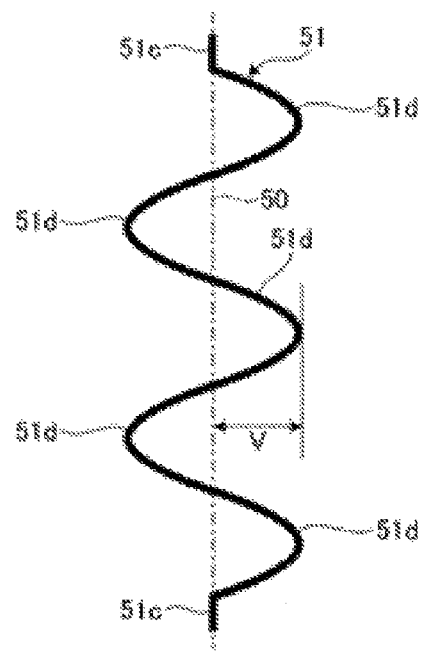
FIG. 4 is a schematic view illustrating a shape of a ridge.

As illustrated in FIG. 3, there is a mode in which the curved parts 51d depart from and return to a straight reference line 50 to form a zigzag shape by bending. Additionally, as illustrated in FIG. 4, there is a mode in which the curved parts 51d depart from and return to the straight reference line 50 to form a wave shape by curving. Additionally, as illustrated in FIG. 5, there is a mode in which the curved parts 51d depart from and return to the straight reference line 50 to form a zigzag shape by inclining and bending. Additionally, as illustrated in FIG. 6, there is a mode in which the curved parts 51d depart from and return to the straight reference line 50 to form a wave shape by inclining and curving. Additionally, as illustrated in FIG. 7, there is a mode in which the curved parts 51d depart from and return to a curved reference line 50 to form a zigzag shape by bending. Note that while not explicitly illustrated in the drawings, there is also a mode in which the curved parts 51d depart from and return to the curved reference line 50 to form a wave shape by curving.

As illustrated in FIGS. 3 to 6, when the reference line 50 is a straight line, a variation V formed by one run-out width of such curved parts 51d departing from and returning to the reference line 50, is expressed by a shortest distance from a peak of the curved parts 51d (position farthest from the reference line 50) to the reference line 50. Additionally, as illustrated in FIG. 7, when the reference line 50 is a curved line, the variation V is expressed by a distance from the peak of the curved parts 51d (position farthest from the reference line 50) to a normal line of the reference line 50.

Figure 8:
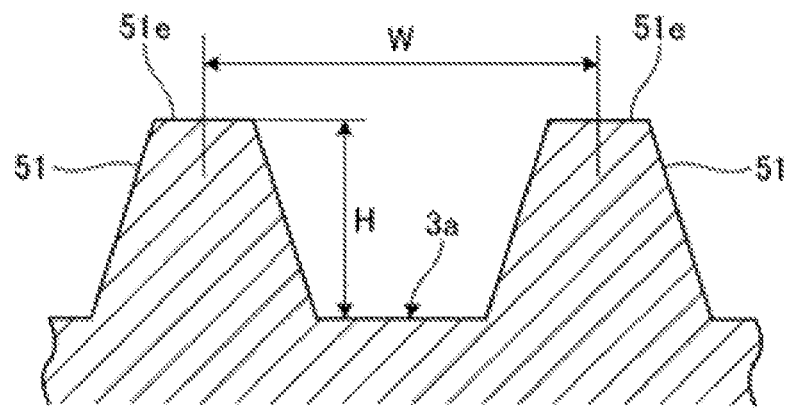
FIG. 8 is a cross-sectional view of a ridge.
Figure 9:
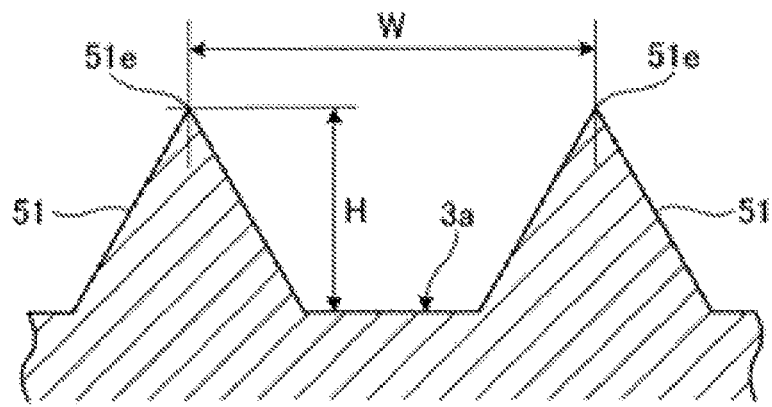
FIG. 9 is a cross-sectional view of a ridge.
Figure 10:
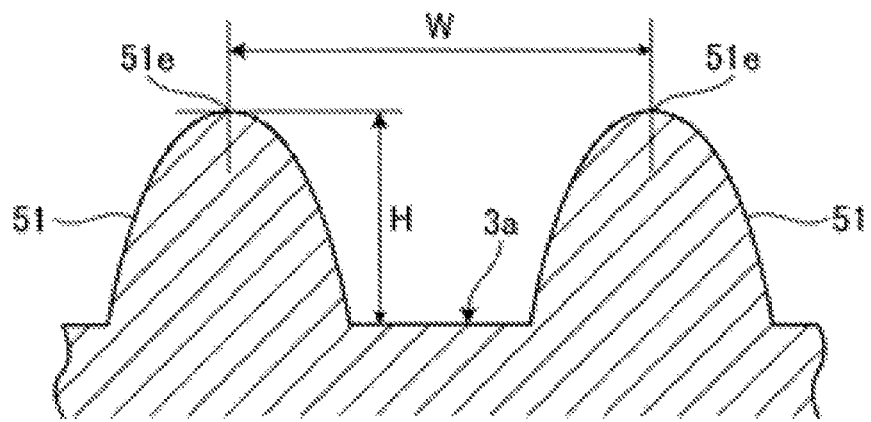
FIG. 10 is a cross-sectional view of a ridge.

Additionally, with regards to the ridges 51, a cross-sectional shape of the protrusions thereof may be trapezoidal as illustrated in FIG. 8, triangular as illustrated in FIG. 9, or peaks 51e may be rounded as illustrated in FIG. 10. Moreover, with regards to the ridges 51, a peak 51e of the protrusions (when trapezoidal, the center of the peak 51e) are positioned on the reference line 50 of the reference parts 51c and are a reference position of the variation V of the curved parts 51d.

Additionally, the peak 51e of the protrusions (when trapezoidal, the center of the peak 51e) is a reference for a distance between the plurality of ridges 51. With the present embodiment, a distance W between the ridges 51 is preferably set to a range of 0.8 mm≤W≤2.0 mm. Here, if the distance W between the ridges 51 is less than 0.8 mm, the distance W between the ridges 51 will be too narrow and the run-out width of the variation V of the curved parts 51d will not be sufficiently obtainable and, therefore, it will be difficult to obtain the visibility effect of the characters 6 via the reference parts 51c and the curved parts 51d. On the other hand, if the distance W between the ridges 51 exceeds 2.0 mm, the distance W between the ridges 51 will be too wide, leading to a tendency for cracking to occur easily between the ridges 51. Note that the distance W between the ridges 51 will change in the tire radial direction in cases where the ridges 51 are orthogonal to the rotational axis of the pneumatic tire 1 (not illustrated), the ridges extend in a radiating manner, and the ridges are provided sequentially in the tire radial direction. A position that is the outermost side in the tire width direction when rim-assembled and inflated is the reference when the distance W between the ridges 51 changes in the tire radial direction.

Additionally with regards to the ridges 51, and as illustrated in FIGS. 8 to 10, a distance from the peak 51e of the protrusion thereof to a surface 3a of the side wall portion 3 is expressed as a height H. This height H of the ridges 51 is preferably set to a range of 0.6 mm<H≤2.0 mm. Here, if the height H of the ridges 51 is not more than 0.6 mm, a distance from the peak 51e of the ridges 51 to the surface 3a of the side wall portion 3 will be too short, and it will be difficult to obtain the visibility effect of the characters 6 via the reference parts 51c and the curved parts 51d. On the other hand, if the height H of the ridges 51 exceeds 2.0 mm, then the flow of vulcanized rubber into the mold for forming the ridges 51 will be unfavorable during molding, leading to a tendency for air pockets to form easily.

Thus, the ridges 51 are continuously formed in the predetermined range between the outer ring 52 and the inner ring 53 from the first edge 51a in the tire radial direction to the second edge 51b, and characters 6 are formed by the reference parts 51c provided on the reference line 50 that connects the first edge 51a in the tire radial direction to the second edge 51b, and the curved parts 51d that depart from and return to the reference line 50 by bending or curving.

According to this pneumatic tire 1, the characters 6 are formed using the ridges 51 by the reference parts 51c and the curved parts 51d. Moreover, cracking in a portion where the ridges 51 are provided can be suppressed because the ridges 51 are formed continuously in the predetermined range between the outer ring 52 and the inner ring 53 from the first edge 51a in the tire radial direction to the second edge 51b.

Additionally, the characters 6 are preferably formed in the tire circumferential direction using the reference parts 51c and the curved parts 51d of the ridges 51.

According to this pneumatic tire 1, is it possible to express the characters 6 with good visibility in the tire circumferential direction such as is not found conventionally, and it is also possible to enhance the visibility of the pneumatic tire 1 itself due to the reference parts 51c and the curved parts 51d of the ridges 51.

Additionally, the variation V of the curved parts 51d is preferably set in a range of 0.3 mm≤V≤5.0 mm. If the variation V of the curved parts 51d is less than 0.3 mm, the run-out width of the variation V will be insufficient, and it will be difficult to obtain the visibility effect of the characters 6 via the reference parts 51c and the curved parts 51d. On the other hand, if the variation V of the curved parts 51d exceeds 5.0 mm, stiffness of the ridges 51 will decrease, and it will be difficult to obtain the suppression of cracking effect. Note that from the perspectives of obtaining the visibility effect of the characters 6 and obtaining the suppression of cracking effect, the variation V of the curved parts 51d is more preferably in a range of 0.5 mm≤V≤3.0 mm.

Figure 11:
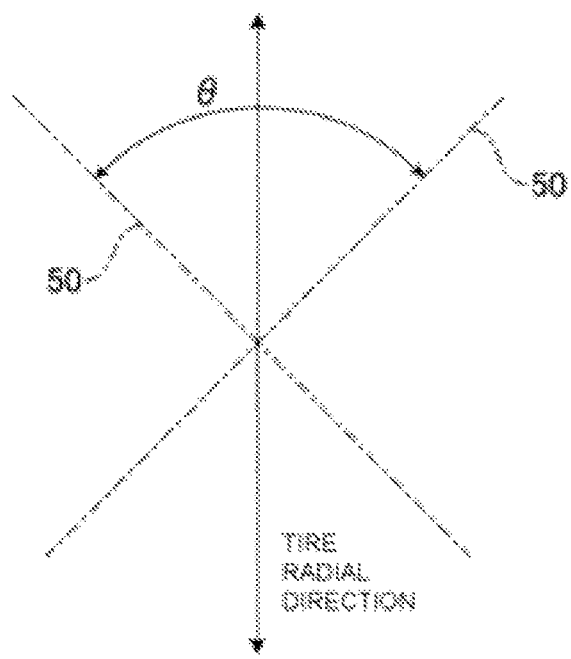
FIG. 11 is a schematic view illustrating the position of a reference line of a ridge.

Additionally, as illustrated in FIG. 11, with the pneumatic tire 1 of the present embodiment, an angle θ of the reference line 50 with respect to the tire radial direction is preferably set in a range of −45°≤θ≤+45° (in other words, ±45°). Note that in FIG. 11, a case is illustrated where the reference line 50 is a straight line, but if the reference line 50 is a curved line, the angle θ with respect to the tire radial direction of a line tangent with the reference line 50 is set to −45°≤θ≤+45°.

If the angle θ of the reference line 50 (or line tangent to the reference line 50) with respect to the tire radial direction deviates from the range of ±45°, deformations will occur in the ridges 51 during travelling, leading to a tendency for cracking in the tire circumferential direction to occur easily.

Figure 12:
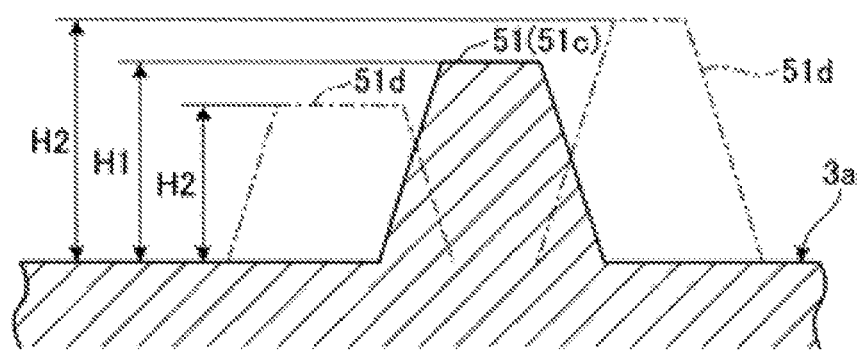
FIG. 12 is a cross-sectional view illustrating heights of a reference part and a curved part of the ridge.

Additionally, as illustrated in FIG. 12, a height H1 of the reference parts 51c from the surface 3a of the side wall portion 3 preferably differs from a height H2 of the curved parts 51d from the surface 3a of the side wall portion 3.

The visibility effect of the characters 6 via the reference parts 51c and the curved parts 51d can be obtained, and the characters 6 can be made prominently visible due to the difference between the height H1 of the reference parts 51c and the height H2 of the curved parts 51d.

Additionally, the height H1 of the reference parts 51c from the surface 3a of the side wall portion 3 is set to a range of 0.6 mm<H1≤2.0 mm, and the height H2 of the curved parts 51d from the surface 3a of the side wall portion 3 is more preferably formed to be lower than the height H1 of the reference part 51c, in a range of 0.2 mm≤(H1−H2)≤0.6 mm.

If the height H1 of the reference parts 51c (in other words, the height H of the ridges 51 on the reference line 50) is not more than 0.6 mm, a distance from the peak 51e of the reference parts 51c to the surface 3a of the side wall portion 3 will be too short, and it will be difficult to obtain the visibility effect of the characters 6 via the reference parts 51c and the curved parts 51d. On the other hand, if the height H1 (H) of the reference parts 51c exceeds 2.0 mm, then the flow of vulcanized rubber into a mold for forming the ridge 51 will be unfavorable during molding, leading to a tendency for air pockets to form easily. Moreover, if the height H2 of the curved parts 51d is less than 0.2 mm lower with respect to the height H1 of the reference parts 51c, a difference between the heights of the reference parts 51c and the curved parts 51d will be small, and it will be difficult to obtain the visibility effect of the characters 6 via the reference parts 51c and the curved parts 51d. On the other hand, if the height H2 of the curved parts 51d is more than 0.6 mm lower with respect to the height H1 of the reference parts 51c, the difference between the heights of the reference parts 51c and the curved parts 51d will be great and differences in stiffness will occur, leading to a tendency for cracking to occur easily in a step portion.

Figure 13:
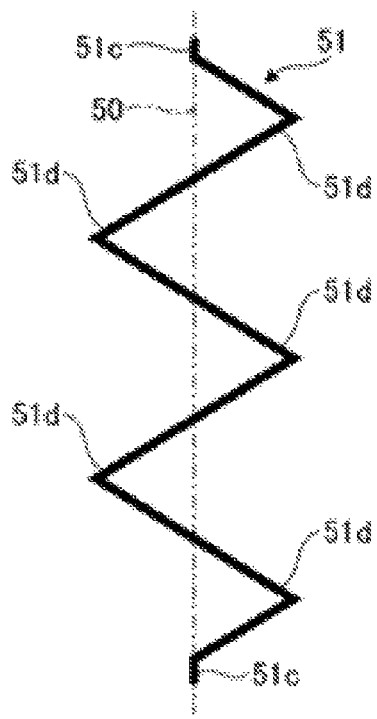
FIG. 13 is a schematic view illustrating a number of curved parts.
Figure 14:
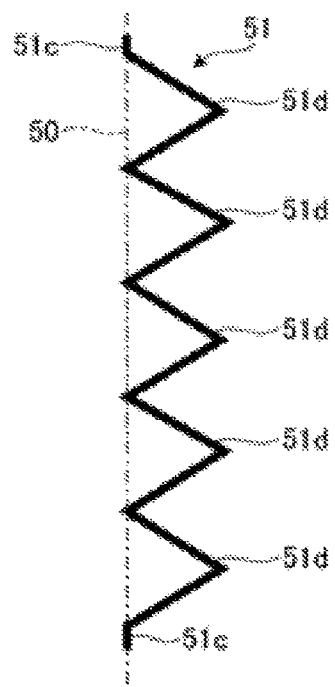
FIG. 14 is a schematic view illustrating a number of curved parts.

Additionally, as illustrated in FIG. 13 and FIG. 14, with the pneumatic tire 1 of the present embodiment, a number of the curved parts 51d formed that depart from and return to the reference line 50 is preferably at least five.

In FIG. 13, a mode in which a total of five of the curved parts 51d are formed on both sides of the reference line 50 is illustrated. Additionally, in FIG. 14, a mode in which a total of five of the curved parts 51d are formed on one side of the reference line 50 is illustrated. If there are less than five of the curved parts 51d, contrast with the reference parts 51c will not be clear, and it will be difficult to obtain the visibility effect of the characters 6 via the reference parts 51c and the curved parts 51d.

EXAMPLES

In the working examples, performance tests for visibility of characters and for cracking resistance were performed on a plurality of types of pneumatic tires under different conditions (see FIG. 15).

The evaluation method for visibility was as follows. Pneumatic tires having a tire size of 205/55R16 were assembled on regular rims ("standard rims" as stipulated by The Japan Automobile Tyre Manufacturers Association (JATMA), "design rims" as stipulated by The Tire and Rim Association (TRA), or "measuring rims" as stipulated by the European Tyre and Rim Technical Organisation (ETRTO)), inflated to an air pressure of 150 kPa, and in this inflated state the side wall portions were visually examined. Then, evaluation was performed on a five-point scale based on the results of this examination. In this evaluation, the pneumatic tire of the Conventional Example is set as the standard score (3), and higher scores indicate superior visibility and are thus preferable.

Additionally, the evaluation method for cracking resistance was as follows. Pneumatic tires having a tire size of 205/55R16 were assembled on regular rims, inflated to an air pressure of 150 kPa, loaded with a load of 4.5 kN, and in this loaded state, ozone having a concentration of 200 pphm was delivered onto the surface of the side wall portions from a distance of 50 mm while being rotated on an indoor drum tester having a drum diameter of 1,707 mm at a speed of 80 km/hr; and, after being rotated for 60 hours, the number of cracks 5 mm or longer on the periphery were counted. In this evaluation, the index value of the pneumatic tire of the Conventional Example is set as the standard score (100) and higher scores indicate superior cracking resistance and thus are preferable.

The pneumatic tire of the Conventional Example is not provided with a ridge portion on the surface of the side wall portion and the characters are formed by protrusions. The pneumatic tires of Working Examples 1 to 10 are provided with a ridge portion on the surface of the side wall portion and the characters are formed by causing variations in the ridges. The variation of the curved parts of the pneumatic tires of Working Examples 3 to 10 is set to the stipulated range (from 0.3 mm to 5.0 mm) Additionally, the angle of the reference line with respect to the tire radial direction of the pneumatic tires of Working Examples 6 to 10 is set to the stipulated range)(±45°). Additionally, a value obtained by subtracting the height of the curved parts from the height of the reference parts of the pneumatic tires of Working Examples 9 and 10 is set to the stipulated range (from 0.2 mm to 0.6 mm) Additionally, the number of the curved parts of the pneumatic tire of Working Example 10 is set to the stipulated range (five or more).

As shown in the test results of FIG. 15, it is clear that each of the pneumatic tires of Working Examples 1 to 10 displays superior visibility and enhanced cracking resistance.

As described above, the pneumatic tire of the present invention is suitable for forming characters using ridges and, at the same time, suppressing cracking in portions where the ridges are provided.

What is claimed is:

1. A pneumatic tire comprising protruding ridges on a surface of a side wall portion extending in a tire radial direction for a predetermined range in the tire radial direction and being provided in a plurality in a row arrangement in a tire circumferential direction, wherein
   the ridges are formed continuously in the predetermined range from a first edge in the tire radial direction to a second edge;
   characters are formed by reference parts of the ridges provided on a reference line that connects the first edge of the ridges in the tire radial direction to the second edge, and curved parts that depart from and return to the reference line by bending or curving;
   individual of the ridges are formed as a single stroke from the first edge to the second edge;
   an individual of the characters is represented by a combination of a plurality of the ridges;
   the curved parts bend or curve across the surface of the sidewall; and
   the reference line is a straight line or a curved line formed having a prescribed curvature from the first edge of the ridges to the second edge.

2. The pneumatic tire according to claim 1, wherein the characters are formed in the tire circumferential direction by the reference parts and the curved parts of the ridges.

3. The pneumatic tire according to claim 1, wherein a variation V of the curved parts is relative to a center line of the curved parts.

4. The pneumatic tire according to claim 1, wherein an angle of the reference line with respect to the tire radial direction is set to a range of ±45°.

5. The pneumatic tire according to claim 1, wherein the curved parts have a different height from the surface of the side wall portion than the reference parts.

6. The pneumatic tire according to claim 1, wherein a height H1 of the reference parts from the surface of the side wall portion is set in a range of 0.6 mm<H1≤2.0 mm, and a height H2 of the curved parts from the surface of the side wall portion is formed lower, with respect to the height H1 of the reference parts, in a range of 0.2 mm≤(H1'H2)≤0.6 mm.

7. The pneumatic tire according to claim 1, wherein a number of the curved parts formed that depart from and return to the reference line is at least five.

8. The pneumatic tire according to claim 1, wherein a height H2 of the curved parts from the surface of the side wall portion is formed to be lower than a height H1 of the reference parts from the surface of the side wall portion.

9. The pneumatic tire according to claim 1, wherein the reference line is a straight line.

10. The pneumatic tire according to claim 9, wherein the straight line is formed from the first edge of the ridges to the second edge.

11. The pneumatic tire according to claim 1, wherein the reference line is a curved line.

12. The pneumatic tire according to claim 11, wherein the curved line is formed having a prescribed curvature from the first edge of the ridges to the second edge.

13. The pneumatic tire according to claim 1, wherein the reference line is a straight line and the curved parts depart from and return to the straight reference line to form a zigzag shape by bending.

14. The pneumatic tire according to claim 1, wherein the reference line is a straight line and the curved parts depart from and return to the straight reference line to form a wave shape by curving.

15. The pneumatic tire according to claim 1, wherein the reference line is a straight line and the curved parts depart from and return to the straight reference line to form a zigzag shape by inclining and bending.

16. The pneumatic tire according to claim 1, wherein the reference line is a curved line and the curved parts depart from and return to the curved reference line to form a zigzag shape by bending or to form a wave shape by curving.

17. The pneumatic tire according to claim 1, wherein when the reference line is a straight line a variation formed by one run-out width of the curved parts departing from and returning to the reference line is expressed by a shortest distance from a peak of the curved parts to the reference line, and when the reference line is a curved line the variation is expressed by a distance from the peak of the curved parts to a normal line of the reference line.

18. The pneumatic tire according to claim 1, wherein a cross-sectional shape of the ridges is trapezoidal, triangular, or rounded.

19. A pneumatic tire comprising protruding ridges on a surface of a side wall portion extending in a tire radial direction for a predetermined range in the tire radial direction and being provided in a plurality in a row arrangement in a tire circumferential direction, wherein the ridges are formed continuously in the predetermined range from a first edge in the tire radial direction to a second edge;

a character is formed by reference parts of the ridges extending along reference lines that connect the first edge of the ridges in the tire radial direction to the second edge, and curved parts of the ridges that depart from and return to the reference line by bending or curving; and the curved parts bend or curve across the surface of the sidewall.

20. The pneumatic tire of claim 19, wherein the character is represented by a combination of a plurality of the ridges.

* * * * *